United States Patent [19]

Riechers

[11] Patent Number: 4,716,991
[45] Date of Patent: Jan. 5, 1988

[54] ELEVATOR GUIDE SHOE

[76] Inventor: Carl Riechers, 7820 Glenbrook Court, Cincinnati, Ohio 45224

[21] Appl. No.: 887,384

[22] Filed: Jul. 21, 1986

[51] Int. Cl.⁴ ............................................. B66B 7/04
[52] U.S. Cl. ...................................... 187/95; 384/33; 384/38
[58] Field of Search ................... 187/1 R, 95; 384/33, 384/42; 104/119; 105/144, 145; 188/250 B

[56] References Cited

U.S. PATENT DOCUMENTS

| | | | |
|---|---|---|---|
| 336,046 | 2/1886 | Friedgen | 187/95 |
| 538,722 | 5/1895 | Biedermann | 188/250 B X |
| 622,792 | 4/1899 | Bates | 384/33 |
| 827,282 | 7/1906 | Anderson | 187/95 X |
| 1,366,132 | 1/1921 | Pitkin | 384/42 X |
| 1,566,490 | 12/1925 | Lindquist | 187/95 |
| 3,032,377 | 5/1962 | Blase | 384/33 |
| 4,271,932 | 6/1981 | Klein | 187/95 |
| 4,541,673 | 9/1985 | Greiert | 384/42 X |

Primary Examiner—Joseph J. Rolla
Assistant Examiner—Nils Pedersen
Attorney, Agent, or Firm—Wood, Herron & Evans

[57] ABSTRACT

An elevator guide shoe for use with a generally cylindrical guide rail or omega rail is disclosed. The guide shoe includes a front arcuate surface to engage the guide rail and two projections or bosses extending from the back of the shoe to engage a shoe bracket. The back surface of the guide shoe is convex which facilitates movement of the guide shoe relative to the bracket and reduces noise as the guide shoe moves relative to the bracket.

7 Claims, 5 Drawing Figures

ELEVATOR GUIDE SHOE

BACKGROUND

Elevators typically are maintained in position and alignment by using a plurality of guide rails which are bolted to the elevator shaft. Guide shoes fixed to the elevator car ride on these rails keeping the car in position.

In the past, most guide rails had a T-shaped cross section. The head of the T is bolted to the building structure and some type of guiding mechanism on the elevator car rides on the stem of the T holding the elevator in place. These types of elevator guide rails are generally shown, for example, in Lindquist U.S. Pat. No. 1,566,490, Klein U.S. Pat. No. 4,271,932 and Blase U.S. Pat. No. 3,032,377.

This system functions well, but the T-shaped guide rails are relatively expensive. To reduce cost, elevator guide rails having a generally cylindrical configuration have been employed. These are commonly referred to as omega guide rails because the actual configuration is that of the Greek letter omega.

The guiding mechanism used with omega rails includes a set of three guide shoes which ride on each rail surrounding the rail. These are held by compressive force between the guide rail and shoe brackets. The shoe brackets are bolted to the elevator. Bosses or projections on the back portion of the guide shoe extend through apertures in the bracket thereby holding the shoes in place relative to the brackets. The apertures are larger than the bosses allowing for some movement. This movement is required because the guide rails are not absolutely straight.

FIG. 1 shows a perspective view of one of these prior art guide shoes. It has an arcuate, front rail engaging surface 11 and a planar back surface 12 with projections or bosses 13 and 14 extending from the back portion.

Very strong compressive forces are required to hold these guide shoes in position between the rail and bracket. Because of these strong compressive forces, when the shoe moves relative to the bracket, it snaps, creating a very loud noise. This tends to frighten elevator passengers. For this reason, the more expensive T-shaped guide rails are preferred over the omega rails regardless of the added expense.

SUMMARY OF THE INVENTION

The present invention is premised on the realization that an elevator guide shoe for use between a shoe bracket and a generally cylindrical omega guide rail can be made which does not create a loud snapping noise when it moves relative to the bracket. By using a guide shoe which has a concave front surface to engage the guide rail and a convex back surface which engages a planar surface of a shoe bracket, the shoe can still be held in place with a great deal of compressive force. However, when it moves, it does not snap. This eliminates the elevator noise problem and permits the less expensive omega guide rail to be used.

The invention and its advantages will be appreciated further in light of the following detailed description and drawings in which:

DETAILED DESCRIPTION

Elevator systems typically include an elevator car which moves in an elevator shaft. To keep the car from bouncing side to side in the shaft, guide systems are employed. A guide system typically includes two or more guide rails fixed to the walls of the elevator shaft. The elevator car includes several guide shoes mounted to the car by shoe brackets which ride on these rails and maintain the elevator aligned in the shaft as it moves up and down. The guide shoes provide a bearing surface between the car and shaft.

Figure 5:
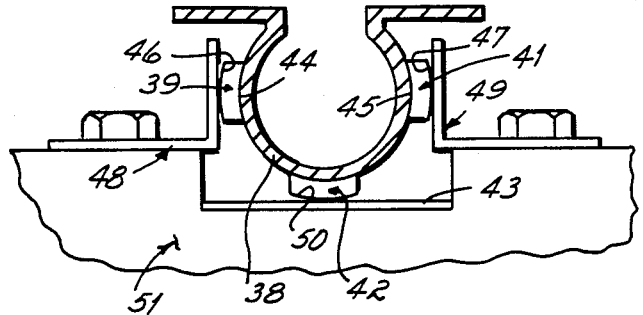
FIG. 5 is an overhead view of an elevator broken away riding on an omega guide rail using the guide shoe of the present invention.

According to the present invention, there is an elevator guide shoe 21, which includes a concave arcuate front surface 22, which is adapted to engage the arcuate surface of a generally cylindrical guide rail or omega type guide rail (38 of FIG. 5). The guide shoe 21 further includes a top and bottom portions 23 and 24, respectively, and elongated sides 25 and 26. Further, the shoe 21 includes a convex, arcuate back portion 27. The convex surface extends from side 25 outwardly and then back inwardly to side 26. Extending outwardly from back 27 are projections or bosses 28 and 29.

Bosses 28 and 29 are adapted to be received within apertures extending through a guide shoe bracket 33 (or plate 43 of FIG. 5). Shoe bracket 33 is basically formed from angle iron having a first panel 34 and a second panel 35, extending at a 90° angle from panel 34. Panel 34 is bolted to an elevator car through a bolt hole 36. Apertures 31 and 32 extend through panel 35. This panel 35 includes a planar shoe engaging surface 37. The guide shoe 21 engages the shoe bracket 33 with the convex back portion 27 of the guide shoe resting against surface 37. Projections 28 and 29 extend through apertures 31 and 32. The apertures 31 and 32 are wider than the projections 28 and 29 allowing for side-to-side movement of the guide shoe 21.

As is discussed below, the bosses cooperate with this aperture to hold the guide shoes in position relative to the guide shoe brackets and the guide. In use, compressive forces between the guide rail and shoe brackets force the guide shoe against the bracket.

In an elevator system, typically, there are two cylindrical guide rails per elevator car. One such guide rail 38 is shown in FIG. 5 from an overhead view extending through the guide rail. Generally cylindrical guide rail 38 which is of the omega type is surrounded by three guide shoes 39, 41 and 42. Two opposed guide shoes 39 and 41 are formed according to the present invention with concave front walls 44 and 45 and convex back walls 46 and 47 which engage guide shoe brackets 48 and 49. The brackets are bolted to the elevator car 51. These are bolted while the brackets and guide shoes are pressed tightly against the rail to hold the guide shoes against the surface of the guide rail. The third shoe 42 simply engages a flat plate 43 bolted to the elevator car 51. This shoe 42 can either have a flat back surface or an arcuate back surface 50 (as shown) according to the present invention. Since shoe 42 moves relatively little, it does not require an arcuate back surface.

Generally, there are two sets of three guide shoes (as shown in FIG. 5) engaging each guide rail. Thus, there are generally twelve guide shoes engaging two guide rails on each elevator car.

The guide shoes of the present invention hold one elevator car in position relative to a set of guide rails permitting the car to ride smoothly up and down the guide rail. Since the bosses of the guide shoes are smaller than the apertures in the shoe bracket, they can move side to side along with the guide shaft. This permits the guide shoe to ride on the shaft even though the shaft is not perfectly straight. Because of the construction of the guide shoes of the present invention, movement of the guide shoes in the bracket does not cause a loud noise. The arcuate surface allows for a gradual movement of the shoe but still permits the shoe to be tightly held between the bracket and the guide rail. Even with this compressive force, the guide shoe can move easily, relative to the bracket, without making a loud snapping noise.

Figure 2:
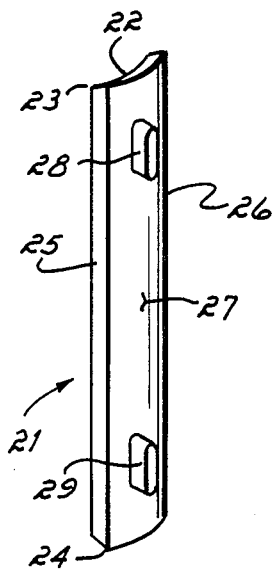
FIG. 2 is a perspective view of a guide shoe for use in the present invention.

As with the prior art guide shoes, the guide shoe of the present invention as shown in FIG. 2 is a one piece molded construction. This would be molded from a tough low-friction polymeric material.

Figure 1:
FIG. 1 is a perspective view of a prior art guide shoe previously described.
Figure 4:
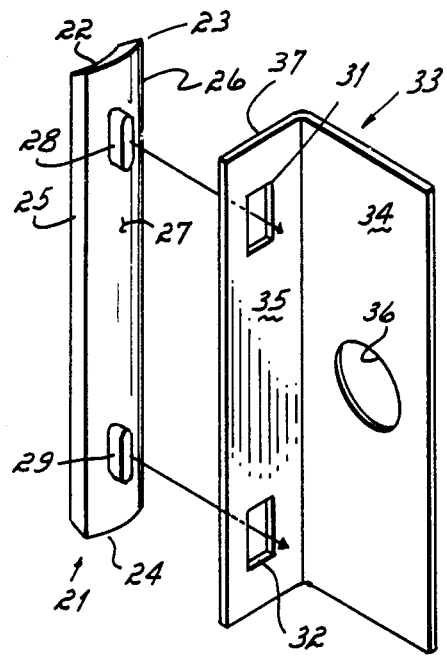
FIG. 4 is a disassembled perspective view of a guide shoe and bracket according to the present invention in combination with a guide shoe bracket.
Figure 3:
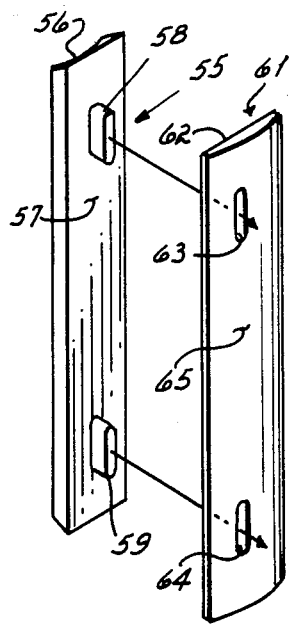
FIG. 3 is an exploded perspective view of an alternate embodiment of the present invention.

FIG. 3 shows an alternate embodiment of the present invention wherein the prior art guide shoe shown in FIG. 1 is modified to incorporate the features of the present invention. In this embodiment, a guide shoe 55 has a concave front 56 and a planar back surface 57 with two projections 58 and 59 extending from the back section.

A curved member 61 engages guide shoe 55 with a planar front surface 62 resting against the back 57 of the guide shoe 55. This member 61 includes two apertures 63 and 64 which permit projections 58 and 59 to extend through portion 61. The projections can then engage the apertures in a guide shoe bracket. Curved member 61 includes a convex back surface 65, substantially the same as the back surface 27 of shoe 21, which will contact the planar surface 37 of the guide shoe bracket and permit the movement of the guide shoe 55 relative to the bracket without causing loud noises. Member 61 is preferably formed from a very hard material such as a metal, preferably iron or steel. The metal back portion absorbs much of the force that is created when the arcuate back surface of a guide shoe engages the planar surface 37 of the bracket. This simply prevents a very strong localized force being applied to a plastic guide shoe.

Different embodiments of the present invention have been described above. These are believed to be the best modes of practicing the invention.

However, the invention is to be defined and limited only by the following claims, wherein I claim:

1. An elevator guid shoe and bracket therefor adapted to ride on a generally cylindrical rail between the rail and a guide shoe bracket comprising:
   a concave rail-engaging surface;
   an opposed convex bracket-engaging surface, including means to engage said guide shoe bracket;
   and means permitting side to side movement of said guide shoe relative to said bracket.

2. An elevator guide shoe as claimed in claim 1, wherein said shoe includes a first member, including said rail-engaging surface and opposed planar surface; and
   a second member including said bracketengaging surface and opposed planar surface adapted to rest on said planar surface of said first member.

3. An elevator guide shoe as claimed in claim 1, wherein said means to fix said shoe to said guide shoe bracket comprises a plurality of projections extending from said bracket-engaging surface and adapted to rest in apertures in said bracket.

4. An elevator guide shoe as claimed in claim 1, wherein said means to fix said shoe to said guide shoe bracket comprises a plurality of projections extending from said surface of said first member through said second member and adapted to engage apertures in said bracket.

5. An elevator apparatus comprising an elevator car in an elevator shaft, a plurality of generally cylindrical guide rails attached to walls of said shaft;
   means for said car to engage said guide rails, said means comprising a plurality of guide shoe brckets mounted to said car and a plurality of guide shoes, an elevator guide shoe adapted to ride on a generally cylindrical rail between the rail and a guide shoe bracket comprising:
   a concave rail-engaging surface;
   an opposed convex bracket-engaging surface, including means to engage said guide shoe bracket;
   one guide shoe held to each of said brackets with said rail-engaging surface engaging said rail and said bracket-engaging surface engaging said bracket;
   said bracket engaging surfaces being free to move side to side relative to said brackets.

6. An elevator guide shoe adapted to ride on a generally cylindrical rail between the rail and a guide shoe bracket comprising:
   a concave rail engaging surface;
   an opposed convex bracket engaging surface, including means to engage said guide shoe bracket;
   wherein said shoe includes a first member, including said rail engaging surface and opposed planar surface; and
   a second member including said bracket engaging surface and an opposed planar surface adapted to rest on said planar suface of said first member.

7. An elevator guide shoe as claimed in claim 6 wherein said means to fix said shoe to said guide shoe bracket comprises a plurality of projections extending from said surface of said first member through said second member and adapted to engage apertures in said bracket.

* * * * *